Figure 1:
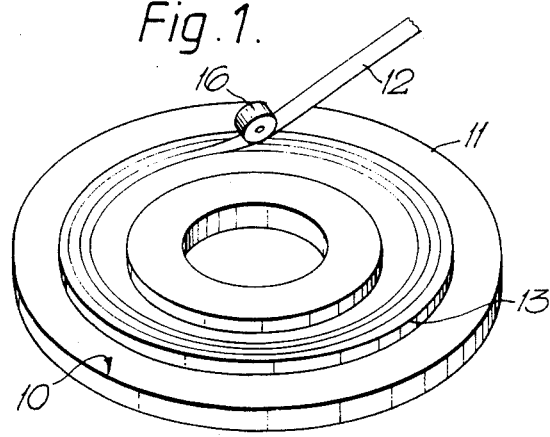

United States Patent [19]

Holroyd et al.

[11] Patent Number: 4,983,239

[45] Date of Patent: Jan. 8, 1991

[54] METHOD OF MANUFACTURE OF TIRE USING AN ANNULAR MOLD TO FORM A MULTI-COMPONENT SUBASSEMBLY

[75] Inventors: Eric Holroyd, Knutsford, Great Britain; Colin Holroyd, Southport, United Kingdom; Anthony J. M. Sumner, Tervuren, Belgium; Anthony R. Wright, Southport, Great Britain

[73] Assignee: Apsley Metals Limited, United Kingdom

[21] Appl. No.: 259,721

[22] Filed: Oct. 19, 1988

[30] Foreign Application Priority Data

Oct. 23, 1987 [GB] United Kingdom ................ 8724849

[51] Int. Cl.$^5$ ............................................. B29D 30/06
[52] U.S. Cl. .................................... 156/123; 156/126; 156/133; 264/501; 264/326
[58] Field of Search ............... 156/123, 125, 126, 136, 156/244.22, 110.1, 133; 264/326, 501; 425/36, 47, 542

[56] References Cited

U.S. PATENT DOCUMENTS

| | | |
|---|---|---|
| 1,899,088 | 2/1933 | Geer .................................. 156/136 X |
| 4,052,496 | 10/1977 | Goodfellow . |
| 4,137,033 | 1/1979 | Goodfellow . |
| 4,743,322 | 5/1988 | Holroyd .............................. 156/123 |

FOREIGN PATENT DOCUMENTS

| | | |
|---|---|---|
| 2272826 | 12/1975 | France . |
| 2133357 | 7/1984 | United Kingdom ............. 156/110.1 |
| 2134439 | 8/1984 | United Kingdom . |

Primary Examiner—Michael W. Ball
Assistant Examiner—Geoffrey L. Knable
Attorney, Agent, or Firm—Stevens, Davis, Miller & Mosher

[57] ABSTRACT

A method of manufacture of a vehicle tire in which an annular mold (11) is filled with uncured elastomeric compound to form in the annular mold an apex (14) and integral chafer (17), and preferably a sidewall (13). The annular mould (11) with the components (14) (17) and (13) in-situ is then brought into alignment with a toroidally shaped tire carcass (22) to assemble the apex (14) and chafer (17) to the carcass.

13 Claims, 2 Drawing Sheets

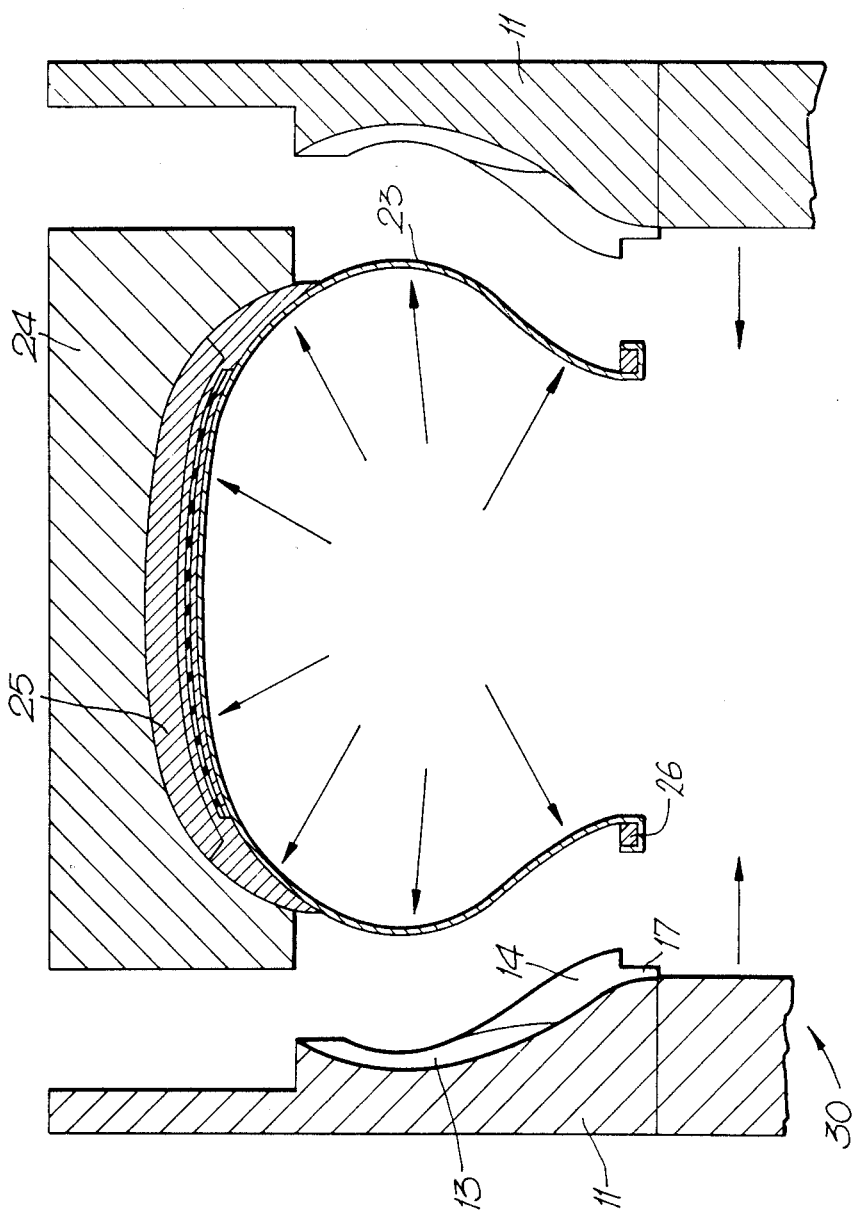

METHOD OF MANUFACTURE OF TIRE USING AN ANNULAR MOLD TO FORM A MULTI-COMPONENT SUBASSEMBLY

This invention relates to a method of manufacture of tires and in particular to radial carcass pneumatic tires for vehicles.

In conventional tire manufacturing processes the tire carcass is assembled on a cylindrical drum and the sidewall components, apexes, and other components such as chafers, bead reinforcements, etc., are added in the flat state. For manufacture of a radial tire, the carcass is then shaped up into a toroidal configuration prior to assembly to a breaker belt.

In British Pat. No. GB 2134439-A, there is described a method of manufacture of a tire in which uncured tire sidewalls are formed substantially to their final shape, as in the finished tire, in discrete annular sidewall molds, and the sidewall molds with sidewall in-situ are brought into contact with a shaped-up tire carcass so as to fit the premolded sidewall to the carcass. Because the tire sidewalls are substantially in their final shape the likelihood of sidewall blemishes is greatly reduced.

However, during the shaping up operation of the carcass it is possible for other tire components, apex, chafer, etc., to distort or to be displaced relative to each other.

The present invention therefore seeks to provide a method of manufacture of a tire having a high degree of consistency and in which the possibility of displacements of tire components relative to each other is greatly reduced.

Accordingly there is provided a method of manufacture of a tire in which uncured elastomeric compound is placed into an annular mold to form an apex and integral chafer in substantially their final shape and the annular mold with uncured apex and chafer in-situ is brought into alignment with a toroidally shaped tire carcass to assemble the apex and chaffer to the carcass.

Further there is also provided a method of making an uncured annular tire component in which an extrudate strip is placed into an annular mold by winding the strip thereon to build up said component to substantially its final shape from a plurality of turns of the strip, and then consolidating the component to its final form on the mold with a minimum flow of uncured elastomeric material.

Conveniently the component is shaped to its final configuration by a forging die. This method is particularly suitable for the manufacture of apex strips, or apex strips in combination with chafer and/or sidewalls.

Also according to the present invention there is provided a tire assembly apparatus including a discrete annular mold having a shallow annular cavity profiled as a lower mold surface for a tire sidewall and chafer, means for filling the cavity with uncured elastomeric compound which is arranged to form in the cavity a sidewall, a chafer, and an apex, and a consolidation die having an upper mold surface thereon profiled to form the sidewall, apex and chafer to the final required shape for assembly to a toroidal tire carcass.

Figure 2:
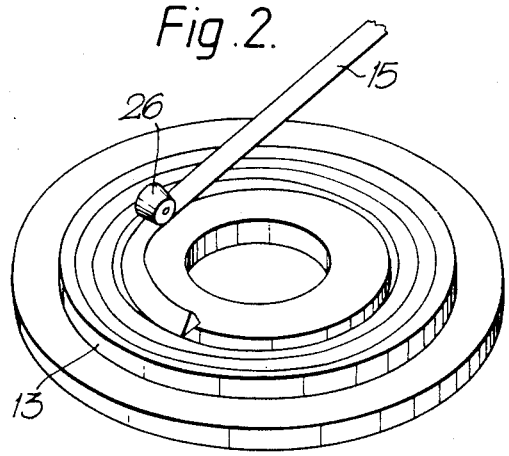
Figure 3:
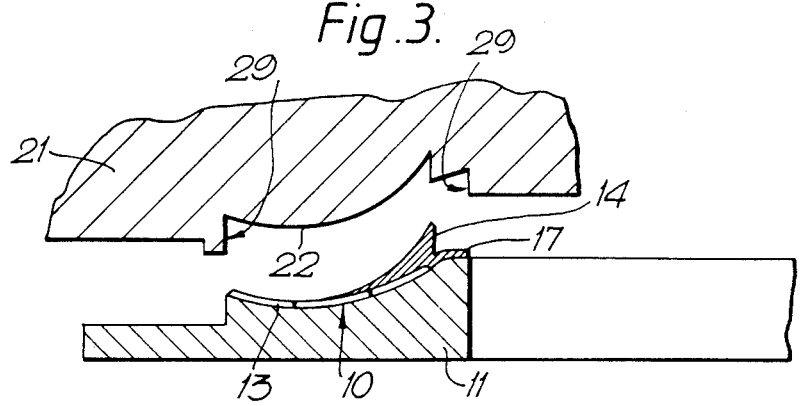

The invention will be described by way of example and with reference to the accompanying drawings in which:

FIG. 1 is a perspective view of a mold having a sidewall component formed therein for the first stage of a method according to this invention, FIG. 2 is a perspective view of the mold of FIG. 1 showing a second stage of the method in which a further component is formed thereon, FIG. 3 shows the forging operation to form the components to their final shape, and FIG. 4 is a schematic drawing through a cross-section of the tire mold showing the assembly of the tire components to the shaped-up carcass.

With reference to FIGS. 1 to 3 of the drawing, there is illustrated a plate-like annular mold base 11 on which a tire component is formed. The illustrated mold base 11 is a sidewall mold which is mounted horizontally and is rotatable about its vertical axis so that in the first stage of manufacture of the tire a spiral strip 12 of sidewall compound can be laid into the mold to form an annular sidewall 13 in the base of the mold. The mold cavity surface 10 has the shape of the exterior sidewall contour of the finished tire. The means of forming the sidewall is described in detail in British Pat. No. GB 2,134,439A, the content of which is hereby incorporated into the present application. The strip 12 is squeezed onto the mold by rollers 16.

In the second stage of manufacture, an apex 14 is then laid from a second strip 15 of elastomeric material which is preferably a harder compound than the sidewall compound. The apex 14 may be laid as a single turn of a profiled strip or may comprise multiple turns of strip which are built up to form a component shape that is as near as possible to the final required form. The chafer 17 (sometimes called a clinch) at the radially inner bead area of the sidewall 13 is also formed by winding a strip of elastomeric material onto the mold. Preferably the apex 14 and chafer 17 are formed from the same compound although it is considered that in some circumstances it may be desirable to use different compounds for the two components.

As in the first stage, the strip 15 is consolidated by a roller 26. The rollers 16 and 26 could be profiled to impart a desired shape to the extrudate strip as it is squeezed doing onto the mold.

FIG. 3 shows the next stage in the process in which a consolidation die 21 has a profiled surface 22 thereon having the final desired shape and configuration of the axially inner surfaces of the apex, chafer, and sidewall for assembly to a shaped up tire carcass. The consolidation die 21 is brought into contact with the sidewall, apex, and chaffer windings to consolidate the windings into a solid continuous mass having the desired final cross-section. The die 21 has shut-off surfaces 29 that close off the annular mold cavity 10 before applying the consolidation pressure, thereby reducing flow of the elastomeric material.

Since the strip windings are assembled as close as possible to the final shape the consolidation operation requires little flow of the various strips and is primarily for assuring adhesion between the windings. The consolidation die 21 may be operated by any suitable method, such as hydraulic press, or by a toggle operated mechanism. It may be necessary to control the relative temperatures of the annular mold 11 and consolidation die 21 to ensure that the uncured components adhere to the mold base.

The annular mold 11 with its three components, that is the sidewall, apex and chafer, is ready for use in assembly of these components to a toroid tire carcass. The natural tack of the elastomeric compounds retains the components in the annular mold.

With reference now to FIG. 4, two annular molds 11 each with shaped components, that is the sidewall 13, apex 14, and chafer 17 held therein in their final shapes are arranged one on each axial side of a toroidal tire carcass 23. The annular molds 11 form part of a tire curing mold assembly 30 which also includes a tread molding ring 24. The tread ring is made up of segments which are mounted in the curing mold assembly 30 so as to be radially movable to allow for removal of the cured tire. The two annular molds 11 are arranged to be axially spaced from the carcass 23 which has been inflated into its toroidal shape within a tread breaker assembly 25 held within the tread mold ring. While the carcass 23 is in the inflated condition, the annular molds are each moved axially inwardly to fit the respective apex 14 over the respective bead 26 as well as to assemble the respective sidewall 13 and chafer components to the carcass.

The completed tire and now completed curing mold assembly are now taken to a curing press for vulcanization of the tire.

While the invention has been described with reference to a preferred process in which the sidewall, apex, and chafer components are formed and consolidated together prior to addition to the tire carcass, in another method, only the apex 14 and chafer 17 components are formed together in a mold, shaped and consolidated, and then assembled to the tire carcass. The annular molds 11 would then have to be removed after assembly to allow for the addition of the sidewalls as described in precisely mentioned British Pat. No. GB 2134439A. Furthermore if it is desired to place a bead reinforcing into the tire, this may be accomplished by placing such a ply into the annular mold. The invention also includes a method of making an annular component by building up the shape of the component in the mold from a series of windings of extrudate ribbon or strip of uncured elastomeric compound and consolidating the windings together with minimal flow of elastomer.

We claim:

1. A method of manufacture of a tire in which uncured elastomeric compound is placed into an annular mold to form a tire sub-assembly comprising at least two components selected from the group consisting of an apex, a chafer, and a sidewall, forming said at least two components to substantially a desired final shape to produce said sub-assembly and bringing the annular mold with said sub-assembly in-situ into alignment with a toroidally shaped tire carcass to assemble said sub-assembly to the carcass.

2. A method as claimed in claim 1 wherein the sub-assembly comprises an apex, and a chafer.

3. A method as claimed in claim 1 wherein said sub-assembly comprises sidewall, apex, and chafer, and an uncured tire sidewall is formed on a discrete annular sidewall mold, and the apex and chafer are then formed and consolidated with the sidewall component held in the sidewall mold, prior to assembly of the three components retained on said sidewall mold, prior to assembly of the three components retained on said sidewall mold to a shaped tire.

4. A method as claimed in claim 2 wherein the apex and chafer are each formed by at least one turn of a ribbon of elastomeric compound placed onto said mold and consolidated said apex and chafer to substantially a desired final shape on the mold by a following roller.

5. A method as claimed in claim 4 wherein the apex is formed by a multiplicity of turns of ribbon wound onto said mold to form an apex shape that is as near as possible to the final required form.

6. A method as claimed in claim 1 wherein said sub-assembly is consolidated into substantially its final shape by a consolidation die of the desired shape, and with as little as possible flow of uncured compound.

7. A method as claimed in claim 3 wherein the sidewall, apex and chafer are consolidated into their final shape by a consolidation die of the desired final shape, and with as little possible flow of uncured compound.

8. A method as claimed in claim 1 wherein the apex and chafer are formed of the same elastomeric compound.

9. A method as claimed in claim 3 wherein the sidewall mold will form part of a tire curing mold assembly after the addition of the sidewall, apex, and chafer to the tire carcass.

10. In the manufacture of a pneumatic tire, a method of making an uncured annular tire sub-assembly comprising at least two components selected from the group consisting of an apex, a chafer, and a sidewall in which said two components are formed from an extrudate strip which is placed into an annular mold by winding the strip thereon to build up said at least two components to substantially a desired final shape to produce said sub-assembly from a plurality of turns of the strip, and then consolidating the sub-assembly to a desired final form on the mold with a minimum of flow of uncured elastomeric material.

11. A method as claimed in claim 10 wherein the final consolidation is by a series of shaped rollers which form the strip onto its required shape.

12. A method as claimed in claim 10 wherein the final consolidation is by means of a die complimentary to the mold and of the desired final shape, said die shutting off the mold before applying the consolidation pressure.

13. A method of manufacture of a tire in which at least two different uncured elastomeric compounds are placed into a disc-like mold to form an uncured annular tire sub-assembly comprising at least two components selected from the group consisting of a sidewall, a chafer and an apex, said method comprising winding a strip of a first compound into the mold to form a first component in substantially a desired finished shape, and then winding a strip of a second compound into the mold to form a second component in substantially a desired finished shape, consolidating the two components together to from a single integral two component sub-assembly, and then assembling the sub-assembly to a toroidally shaped tire carcass.

* * * * *